United States Patent
Uhl

(10) Patent No.: US 6,633,381 B2
(45) Date of Patent: Oct. 14, 2003

(54) POLYCHROMATIC FLUORESCENCE MEASUREMENT DEVICE

(75) Inventor: Rainer Uhl, Gräfelfing (DE)

(73) Assignee: Till I. D. GmbH, Grafelfing (DE)

( * ) Notice: Subject to any disclaimer, the term of this patent is extended or adjusted under 35 U.S.C. 154(b) by 119 days.

(21) Appl. No.: 09/829,065

(22) Filed: Apr. 10, 2001

(65) Prior Publication Data

US 2001/0028455 A1 Oct. 11, 2001

(30) Foreign Application Priority Data

Apr. 10, 2000 (DE) .......................... 100 17 825

(51) Int. Cl.⁷ .................................................. G01J 3/30
(52) U.S. Cl. ....................................................... 356/317
(58) Field of Search ................................. 356/317, 318; 250/234, 226, 458.1, 459.1, 461.1

(56) References Cited

U.S. PATENT DOCUMENTS

| 5,751,417 A | 5/1998 | Uhl |
| 6,088,097 A | 7/2000 | Uhl |
| 6,396,053 B1 * | 5/2002 | Yokoi .......................... 250/234 |

FOREIGN PATENT DOCUMENTS

| DE | 41 15 401 A1 | 11/1992 |
| DE | 42 28 366 A1 | 3/1994 |
| DE | 43 30 347 A1 | 3/1995 |

* cited by examiner

*Primary Examiner*—Tu T. Nguyen
(74) *Attorney, Agent, or Firm*—Nixon Peabody LLP; David S. Safran

(57) ABSTRACT

A fluorescence-measuring device for scanning a specimen (36, 226) with a selection element (26, 206). Excitation light is coupled to an excitation beam path and guided to the specimen surface. Fluorescent light, which is emitted by the specimen surface, crosses the excitation beam path in a reverse direction and at the same time is decoupled from the excitation beam path. In the beam path, there is a first dispersive element (30, 210) so that the fluorescent light emitted by the specimen surface can strike the selection element spectrally split. The selection element includes a first area (48, 240) and a second area (26, 242) allowing selection between the excitation and fluorescent light. According to a first aspect, a spatial extension of a transmission area (26) is adjustable in order to adjust the transmitted wavelength range of the emission light. According to a second aspect, the selection element (206) makes it possible to operate with a coherent excitation having several laser lines. A two-dimensional confocal measurement arrangement can be accomplished and the emission light separated from the excitation light can be detected with spectral resolution.

11 Claims, 2 Drawing Sheets

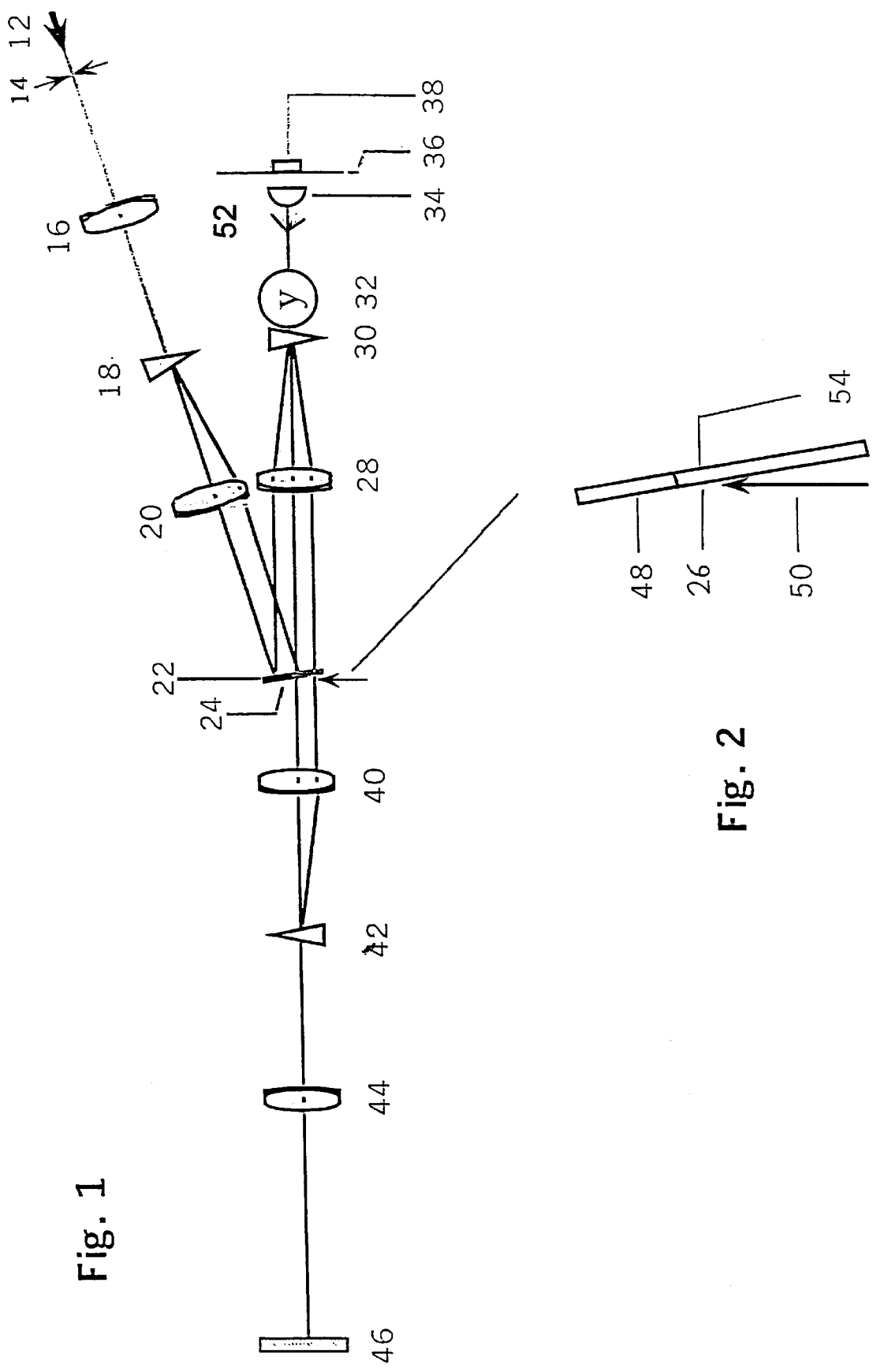

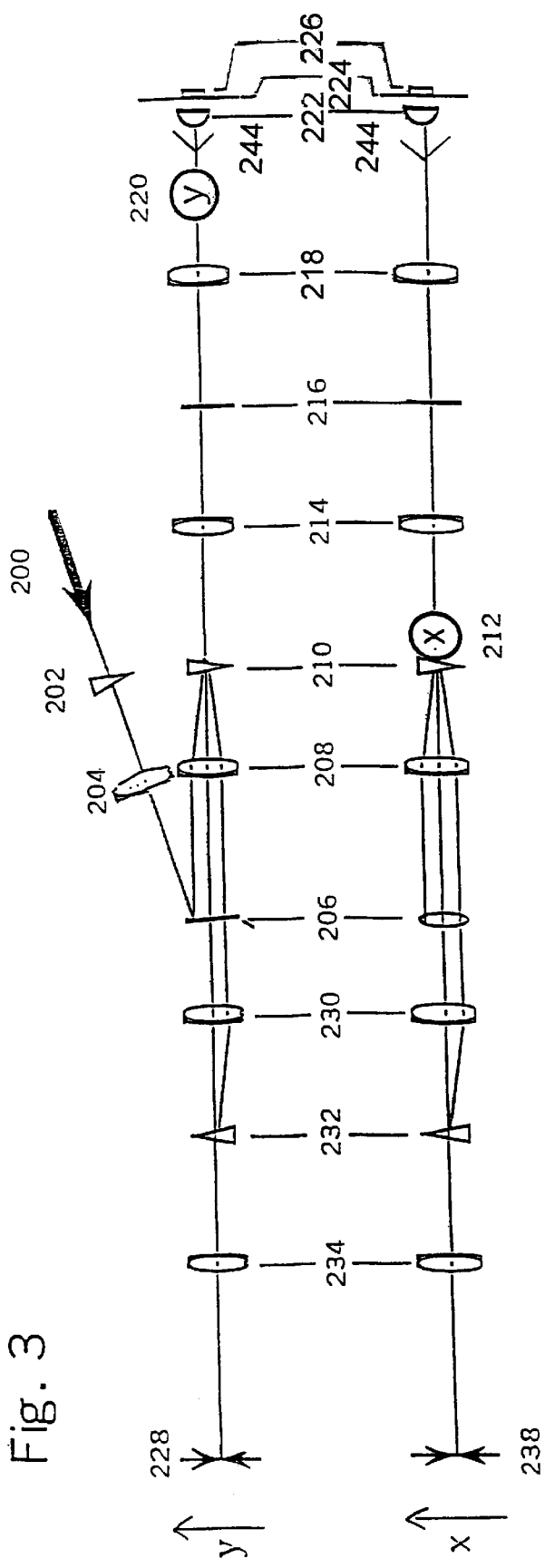
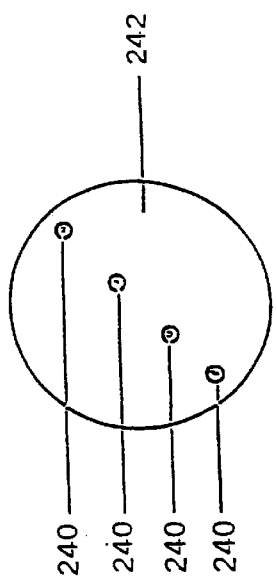
Fig. 3
Fig. 4

POLYCHROMATIC FLUORESCENCE MEASUREMENT DEVICE

BACKGROUND OF THE INVENTION

1. Field of the Invention

This invention relates to a fluorescence measurement device for scanning a specimen.

2. Description of Related Art

In the epifluorescence mode of a fluorescence measurement the excitation and the emission beam path run in parallel for a certain distance and are separate from one another at a given' point. The separation is usually achieved by using a dichroic beamsplitter, which is capable of reflecting light below a given wavelength and transmits longer wavelength light. The necessity of having to use one such filter makes it difficult to rapidly change the excitation or the emission wavelength. In U.S. Pat. No. 5,751,417, describing a special type of confocal fluorescence microscope, the problem is circumvented by combining respectively separating excitation and the emission beam path without the aid of beam splitters, by employing dispersive elements, for example prisms. In doing so, the visual field is illuminated with a plurality of slit-shaped or point-shaped "light windows" and the preparation is "scanned" by simultaneous movement of these illuminated fields. Published German Patent Application DE 43 30 347 A1 discloses a slit formed between two reflecting slit jaws, which allow to adjust the slit width, thus dividing the light beam, previously spectrally dispersed by a prism, into three spectral regions: one center wavelength region corresponding to the light passing the slit, one wavelength region above the center wavelength, being reflected by one jaw of the slit, and one wavelength region below the center wavelength, being reflected by the other jaw of the slit.

This invention is aimed at providing a fluorescence measurement device, which retains the indicated advantages of the device known from U.S. Pat. No. 5,751,417, but, by abandoning the need for parallel scanning and by focussing on individual "light windows", allowing a more easy implementation. Moreover, with such individual "light windows" an improved stray-light suppression is achieved, and free, independent selection of the excitation wavelength, the emission wavelength and the emission bandwidth is allowed. In one special embodiment it is even possible to operate simultaneously with several excitation wavelengths and make accessible all the spectral information of the emission light for evaluation.

SUMMARY OF THE INVENTION

A primary objective of the invention is to provide a fluorescence-measuring device for scanning a specimen with a selection element.

This objective is achieved in accordance with the invention in that an excitation light is coupled to an excitation beam path by the selection element and guided to the specimen surface. Fluorescent light, which is emitted by the specimen, follows the excitation beam path in a reverse direction. A first dispersive element in the beam path causes a deviation of the emission beam from that of the excitation beam and allows the separation of the emission beam and the excitation beam on the selection element. The selection element includes a first area and a second area, thereby allowing selection between the excitation and the fluorescent light.

The boundaries of the second area are adjustable in order to allow the free selection of the wavelength range of the fluorescent light to be detected and to preset a desired Stoke's shift. In this approach, the simple and flexible choice of the emission wavelength, emission bandwidth and the desired Stoke's shift is advantageous.

In another embodiment of the present invention, it is advantageous to have several excitation and emission wavelengths measurements possible at the same time and confocality in two spatial directions enabled.

This invention separately provides for a special configuration of the selection element. This object is achieved in that the selection element preferably includes a first area and a second area. The first area and the second area capable of reflecting and are tilted against one another in order to reflect the excitation light and the fluorescent light in different directions.

In the following, embodiments of the invention are explained in detail by way of example using the attached drawings.

BRIEF DESCRIPTION OF THE DRAWINGS

FIG. 1 schematically shows the beam path in a fluorescence measurement device according to the first embodiment;

FIG. 2 shows an enlarged representation of the selection element from FIG. 1;

FIG. 3 shows a schematic of the beam path of a fluorescence measurement device in a second embodiment, in which the Y direction (upper part of FIG. 3) and the Xdirection (lower part of FIG. 3), respectively, form the transverse direction; and FIG. 4 shows the enlarged representation of a selection element, which can be used in the arrangement shown in FIG. 3.

DETAILED DESCRIPTION OF THE INVENTION

In the first embodiment of the invention as shown in FIGS. 1 and 2, in contrast to the approach known from U.S. Pat. No. 5,751,417, only a single aperture diaphragm is used instead of several aperture diaphragms which are illuminated at the same time. The aperture diaphragm need not have a defraction-limited height, but can illuminate the preparation as a strip of extended height. Then, the image recorded on the surface sensor can correspond to one such strip and the entire image must be composed of several such strips guided over the preparation with a scanner. The advantages produced by the abandonment of a one-dimensional confocality and the increase in speed provided by parallel scanning are both a freely adjustable emission bandwidth and a Stoke's shift.

One possible configuration of this principle is shown in FIG. 1. For example, light limited to a narrow wavelength range from a light source 12 can be used. Preferably, a galvanometer-mounted grating arrangement is utilized that is analogous to the grating arrangement known from published German Patent Application DE 42 28 366 A1, where a light source is described in which light is guided via a parabolic mirror, onto a holographic diffraction grating, which can be turned by means of a scanner, and light with a spectral composition, which depends on the angle of rotation of the diffraction grating, is focused onto an exit slit, where it is fed, for instance via an optical fiber, into the excitation beam path of the microscope. Light source 12 uniformly illuminates a slit 14, having an adjustable size, and an image of this slit is formed in an intermediate image plane 22 with the help of a spectrometer arrangement, comprised of a dispersive element 18 in between the imaging elements 16 and 20.

A deflection element 24, which is placed in this intermediate image plane, comprises a fixed jaw 48 formed by a reflective area, and a jaw 50 movable relative to the fixed jaw 48. A transparent, antireflection-coated part 54 is adjacent to the reflective area of the fixed jaw 48. The portion of the transparent part 54 between the fixed jaw 48 and the moveable jaw 50 forms an adjustable slit-arrangement gap 26. Monochromatic excitation light is reflected by the reflective fixed jaw 48. Thus, the deflected light passes through a tube lens 28 and a deflection unit images the light to infinity. The light is then deflected by a second dispersive element 30, which is operated in subtractive dispersion relative to the dispersive element 18. By means of a pivotally mounted deflection mirror 32, the light is guided onto the objective 34.

The objective 34, forms a (usually demagnified) image of the original slit-plane 14 in the specimen plane 36. It can be scanned across the specimen 38 by tilting the deflection mirror 32. Fluorescent light 52 emitted by the strip of the specimen illuminated in this way passes backwards through the optical arrangement. Due to its red shift compared to the excitation beam light, the light is less strongly deflected by the dispersive element 30 and ends up in the first intermediate image plane 22 as a spectrally smeared strip, which is spacially shifted relative to the excitation beam.

With the corresponding positioning of the strip relative to the jaws 48, 50 of the slit-arrangement gap 26, by adjusting the movable jaw 50 relative to the fixed jaw 48, the width of the gap 26 can be set and thus the spectral bandwidth can be influenced as by a spectrometer exit slit. Thus, however, in both the excitation and the emission beam path the beam position in the intermediate image plane changes with changing wavelength, either the entire deflection element 24 together with the gap 26 according to the desired wavelength must be shifted, or, in the vicinity of the dispersive element 18, an adjustable deflection unit must be placed in the beam allowing the positioning the excitation beam on the deflection unit. Each of the indicated adjustment possibilities are used for placement of the excitation beams on the reflecting part 48 of the deflection element 24, and thus, for adjustment of the desired Stoke's shift.

The spectrally "smeared" intermediate image is transmitted by the portion of the antireflection-coated part 54 of the selection element 24, forming the slit 26, and is imaged by a spectrometer arrangement, which is operated in the reverse dispersion. The spectrometer arrangement is formed by an optical element 40, which images the intermediate image plane to infinity, a dispersive element 42, which reverses the previous spectral dispersion, and another optical element 44, which focuses the beam onto the surface sensor 46. The resulting image of the illuminated strip on the sensor, is no longer "smeared."

A full image can be assembled from several such strip images, each having been recorded after a rotation of the mirror 32. It can be considered a disadvantage that the Stoke's shift, i.e., the shift between the excitation wavelength and the emission wavelength, is constant only at an infinitesimally narrow gap for each pixel. In a strip image composed of several sensor lines, the Stoke's shift in each line increases by a finite $\Delta\lambda$. However, it can be an advantage having a system, which has a rectangular wavelength transmission area, i.e., the spectral transmission, which is different than a filter system. In this case, the entire transmission range reaches 100%.

The minimum Stoke's shift, which can be achieved with the above-described arrangement, is determined by the spectral bandwidth of the excitation light. If a coherent, monochromatic, excitation light source is used for strip-like illumination of the intermediate image plane 22, this limitation is eliminated and the entire optical arrangement of the elements 16–20 can be omitted. Moreover, if we go a step further and reduce the illuminated strip in its narrow dimension to the diffraction-limited width in the intermediate image plane 22, i.e., between the slit-jaws, we can achieve a two-dimensional intensity distribution of the emission light, which contains in one direction solely spatial, and in the other direction solely spectral information.

However, for spectrally resolved read-out, it is not sufficient to image the two-dimensional intensity distribution onto an array detector, because the excitation-light, which exceeds the emitted light in brightness by several orders of magnitude, would provide too much stray-light due to scattering or reflection on the diverse optical elements. This problem can again be overcome by the use of subtractive dispersion, i.e., by allowing the beam to pass through another spectrometer arrangement, which reverses the previous dispersion. One especially useful arrangement of this type, wherein a diffraction-limited "spot" is scanned over the preparation in two dimensions, instead of a slit-shaped light-window, which must be guided over the preparation in only one dimension, is described below.

While in the embodiment shown in FIGS. 1 and 2 a laser light source is optional in the genuinely confocal embodiment as shown in FIGS. 3 and 4, a laser light source is mandatory for excitation. Since the preparation is to be "scanned" in two dimensions, x and y, which are independent of one another, the emission beam path must be split not only spectrally and combined again, but must also be guided in two dimensions through a confocal aperture. Of the many fundamentally possible arrangements which satisfy the indicated conditions, the version shown in FIGS. 3 and 4 is characterized by a relatively good feasibility and mainly by the freedom to be able to take measurements at the same time, at several excitation and emission wavelengths.

Collimated laser light 200 is spectrally deflected using a dispersive element 202, and is focused using an optical element 204 on a beam splitter element 206, which is partially reflective in a special way as shown in FIG. 4. This element is transparent 242 outside of the reflecting areas 240. For a laser-beam containing more than one laser-line, the dispersive element 202 determines the positions of the corresponding diffraction-limited focal points on the beam splitter element 206. All such focal points follow a straight line when the wavelength of the laser light is varied.

Since there is usually only a limited number of laser wavelengths (exceptions see below), few reflecting points are needed at the corresponding positions of the beam splitter element 206 to couple all possible excitation wavelengths at the same time or in succession into the beam path.

For technical reasons, the plane of the beam splitter element 206 should preferably be relatively vertical, i.e., have a small deflection angle. The beam splitter element 206 is imaged, using an optical element 208, into infinity. The beam is also recollimated using a dispersive element 210, which corresponds to the element 202 and which reverses the dispersion of 202. A scan element 212 is used for deflecting the recollimated beam in one direction (here, the x direction).

Another imaging optical element 214 re-focuses the beam, and, in its focal plane 216, produces a diffraction-limited focal point, which moves in the x dimension with the scanning movement of the scan element 212.

Another optical element 218 images the focal point again to infinity and another scan element 220 provides for deflection of the beam in the y direction. An objective 222 images the beam which is now scanned in two orthogonal dimensions into the specimen plane 224 where the specimen 226 to be studied is located. The fluorescent light 244 emitted by the illuminated specimen passes through the optical arrangement backwards and is spectrally split at the same time.

Due to the Stoke's shift, i.e., the fact that the emitted light possesses always longer-wavelengths than the pertinent excitation light, the focal point always ends up in a position of the intermediate image plane 206, which is shifted relative to its origin on a line. Since only the points corresponding to the spot impact sites for the various laser wavelengths are reflective on this line (see FIG. 4), the emitted light is not reflected, but transmitted for the most part.

Another spectrometer arrangement formed of an element 230, which images to infinity, a dispersive element 232 which reverses the dispersion of element 210, and an imaging optical element 234, produces, in the focal plane of the element 234, a point with an extension which can be influenced by a diaphragm means 228, 238 which is adjustable in two dimensions in the manner of a confocal diaphragm. The described subtractive dispersion ensures that only light, which has passed through the line area of the beam splitter element 206, having the wavelength corresponding to its position on the line, can pass through the diaphragm. Scattered light is thus effectively eliminated.

The light passing through the confocal diaphragm combination 228, 238 is confocal in two dimensions and contains all wavelengths with the exception of the "filtered out" excitation wavelengths. The light can be spectrally split using beam splitters or dispersive elements and can be supplied to several detectors for spectrally resolved recording, i.e., it is possible to take measurements at the same time at several emission wavelengths.

Detectors can be individual, discretely structured light sensors (for example, photomultipliers or avalanche photodiodes), and also the pixels of a line sensor or array sensor. Distributing the spectrum, using a dispersive element, among several pixels of a line sensor or array-sensor, analogously to the procedure described in U.S. Pat. No. 6,088,097, is especially advantageous, because these sensors usually have a higher quantum yield than the photomultiplier.

If the sensor, in the "spectral" dimension, has more pixels than the desired spectral resolution necessitates, this must be considered by the correspondingly flexible electronic read-out modes, i.e., so-called "binning" of pixels and "discarding" of unwanted information. If it is an array sensor, which also has an extension in the dimension which is orthogonal to the "spectral dimension," the "spatial proximity in the preparation" which is converted to "time proximity" by the original scan process, is spread out using another scan device into yet another "spatial proximity" on the chip. Note that the lines of the scanning process need not run synchronously with the lines of the chip.

In a simplified modification of the described arrangement, the confocal diaphragms 228 and 238 can be replaced by a confocal diaphragm for the y-direction in the plane 216 and a confocal diaphragm for the x-direction in the plane of the beam splitter element 206. In this case the elements 230, 232 and 234 can be omitted.

Another important advantage of the described arrangement is that, at the same time or in succession thereof, measurements can be taken with several excitation wavelengths. They only need to be contained in the collimated laser beam 200 at the same time or quickly in succession thereof. This is achieved by using a laser, which has several lines at the same time or by using a collinear coupling of different lasers into one laser beam. The latter can be achieved by dichroic beam splitters, or better yet, by a spectrometer arrangement in which a dispersive element converts various entry angles dictated by the respective wavelength into a common exit angle.

One such spectrometer arrangement is described in the published German patent application DE 41 15 401, where light of two different light sources, for example, pulsed lamps, is guided by an optical fiber, each onto a reflection grating which reflects the light of the two light sources into a third optical fiber which is located in the exit gap plane.

Alternatively, a galvanometer-mounted grating arrangement can be used to switch back and forth in milliseconds between different laser light sources, and thus, wavelengths. The grating arrangement can be made as a feasible modification of the arrangement described in published German patent application DE 42 28 366 A1, where a light source is described in which white light is guided via a parabolic mirror onto a holographic diffraction grating, which can be turned by means of a scanner, and light with a spectral composition, which depends on the angle of rotation of the reflection grating, reflects back onto the parabolic mirror, from where it is fed via an optical fiber into the excitation beam path of the microscope.

As experience has shown, as the dispersive element, a holographic volumetric grating need not necessarily be used. The required low moment of inertia can also be achieved with conventional ruled or holographically recorded surface gratings. In the simplest case, the laser is coupled both into the spectrometer and also into the polychromatic fluorescence microscope, using fibers.

Instead of using a laser with one or more discrete laser lines, in the described arrangements it is also possible to work with a pulsed whitelight laser, which produces coherent light with a quasi-continuous spectrum. In this case, especially flexible wavelength selection of the excitation light and the emission light is enabled. The beam-spitter element 206 may even serve as an element which determines the fraction of the white light which is to be used for excitation.

Furthermore, the described arrangements can also be used for 2-photon excitation.

Regarding the described optical arrangements, it can be stated that the beam path should be laid out preferably telecentrically, i.e., that the focal planes of the successive imaging elements come to rest on one another. These planes, at the same time, mark the preferred locations for placement of the elements, which are used to deflect the beam spectrally (dispersion elements) or in conjunction with the raster scanning (scan elements) of the preparation. This placement ensures that the pupil beam path in the scan process or in the spectral splitting remains stationary. Where one such placement is not possible, for example because two elements cannot sit exactly at the same location or because one focal plane is not directly accessible, it should be placed either as near as possible to the optimal position to minimize the beam offset, or one or more intermediate imaging must be introduced so that the ideal position is made accessible.

In the embodiments shown in the figures, the dispersive elements are designed to be two-dimensional in order to ensure the maximum interfering light suppression. Of course, for simplification of the optical arrangement, dispersion only in one dimension can also be imagined.

The selection elements 26 and 206 are operated, in this example, such that the excitation light is coupled into the excitation beam path by means of reflection in the reflecting area. The fluorescent light is decoupled by means of transmission through the transmitting area, the spatial limitation of the transmitting area acting as the wavelength limitation for the fluorescent light to be detected.

Basically, this principle can also be reversed so that the excitation light is coupled into the excitation beam path in a straight line through the transmitting area, while the fluorescent light is decoupled by means of reflection in the reflecting area for detection. Then the spatial limitation of the reflecting area acting as a wavelength limitation for the fluorescent light can be detected. An arrangement is also conceivable in which both the excitation light and also the emission light are reflected by the selection element. The reflected beam pencils must differ in their angle such that efficient beam separation becomes possible.

What is claimed is:

1. A fluorescence measuring device for scanning a specimen surface, comprising:

a selection element having a first area and a second area, the second area being spatially separate from the first area;

an excitation light source coupled to an excitation beam path by the first area of the selection element, excitation light of a wavelength range being guided from the light source to the specimen surface and causing fluorescent light to be emitted from the specimen surface crossing the excitation beam path and travel in a reverse direction of the excitation beam path toward the selection element;

a first dispersive element in the excitation beam path for spectrally splitting the fluorescent light emitted from the specimen and allowing a portion of the spectrally split fluorescent light to strike the second area of the selection element, which is adapted to decouple the fluorescent light from the excitation beam path;

a detector for recording fluorescent light decoupled by the second area of the selection element; and a second dispersive element which acts in reverse dispersion with respect to the first dispersive element and is in a path of the decoupled portion of the spectrally split fluorescent light;

wherein boundaries of the second area are adapted to interact with the second dispersive element and act as a wavelength limitation for the florescent light in order to mask out at least the wavelength range of the excitation light; and wherein said excitation light source comprises at least one laser device for coherent excitation of separate laser spectral lines, excitation light of each spectral line being focused in a separate imaging area on the selection element, the position of each imaging area being determined by the wavelength of the associated spectral line, the positions of said imaging areas on the selection element being ordered with respect to the wavelength of the associated spectral line, whereby said imaging areas form the first area, and whereby an area between the imaging areas and an area which adjoins a last imaging area, which is associated with the spectral line having the greatest wavelength, in a direction of increasing wavelength of the associated spectral lines together form at least one part of the second area.

2. The device as claimed in claim 1, wherein the first area is adapted to reflect and the second area is adapted transmit light.

3. The device as claimed in claim 2, wherein the excitation light of each spectral line is imaged as a diffraction-limited spot onto the selection element.

4. The device as claimed in claim 3, wherein only areas of the selection element in which the spots are located are made to reflect, while the other areas are made to transmit.

5. The device as claimed in claim 1, further comprising a third dispersive element which is operated in reverse dispersion with respect to the first dispersive element, and is positioned such that a collimated beam of the excitation light, which contains the spectral lines, passes therethrough before striking the selection element.

6. The device as claimed in claim 5, wherein the first, the second and the third dispersive elements are each adapted to act dispersively in two orthogonal directions.

7. The device as claimed in claim 1, further comprising means for imaging the excitation light as a diffraction-limited spot on the specimen surface and a confocal diaphragm for the fluorescent light in each of two spacial directions.

8. The device as claimed in claim 7, wherein the confocal diaphragms lie in a plane, which is conjugate to a plane of the selection element.

9. The device as claimed in claim 1, wherein the selection element is imaged into a first plane, which lies in a plane conjugate to the specimen surface.

10. The device as claimed in claim 9, wherein, between the first plane and the specimen surface, there is a first deflection unit, which is adapted to deflect the excitation light in a first spatial direction in order to guide the excitation light spot over the specimen surface.

11. The device as claimed in claim 10, wherein, between the first plane and the selection element, there is a second deflection unit, which is adapted to deflect the excitation light in a second spatial direction which is perpendicular to the first deflection direction.

* * * * *